(12) United States Patent
Stukenholtz et al.

(10) Patent No.: US 8,251,788 B2
(45) Date of Patent: Aug. 28, 2012

(54) AGRICULTURAL MATERIAL SEPARATOR (76) Inventors: Ty E. Stukenholtz, Waukee, IA (US);
Jay E. Stukenholtz, Nebraska City, NE (US)

(*) Notice: Subject to any disclaimer, the term of this patent is extended or adjusted under 35 U.S.C. 154(b) by 0 days.

(21) Appl. No.: 12/925,825

(22) Filed: Oct. 30, 2010

(65) Prior Publication Data
US 2012/0108302 A1    May 3, 2012

(51) Int. Cl.
*A01F 12/44* (2006.01)
*B07B 1/00* (2006.01)

(52) U.S. Cl. ........................................................ 460/79

(58) Field of Classification Search .................... 460/79, 460/115, 96, 143, 131, 145, 903, 102, 100; 56/202, 16.6, 13.3
See application file for complete search history.

(56) References Cited

U.S. PATENT DOCUMENTS

| | | | | |
|---|---|---|---|---|
| 2,587,289 A * | 2/1952 | Cook | | 460/59 |
| 3,623,298 A | 11/1971 | Hitzhusen | | |
| 3,626,677 A * | 12/1971 | Sides | | 56/328.1 |
| 3,698,171 A * | 10/1972 | Hecht | | 56/331 |
| 3,721,075 A * | 3/1973 | Weiberg | | 56/13.5 |
| 4,188,160 A | 2/1980 | Corbett et al. | | |
| 4,295,325 A | 10/1981 | Cannavan | | |
| 4,364,222 A * | 12/1982 | Ramacher | | 56/328.1 |
| 4,455,814 A | 6/1984 | Kienholz | | |
| 4,642,977 A * | 2/1987 | Ramacher | | 56/328.1 |
| 4,753,296 A * | 6/1988 | Kruithoff | | 171/26 |
| 4,896,486 A | 1/1990 | Lundahl et al. | | |
| 4,930,981 A | 6/1990 | Walker | | |
| 4,996,829 A | 3/1991 | Saitoh | | |
| 5,001,893 A * | 3/1991 | Stanley et al. | | 56/328.1 |
| 5,024,278 A * | 6/1991 | Shuknecht | | 171/17 |
| 5,224,327 A | 7/1993 | Minoura | | |
| 5,245,817 A | 9/1993 | Hohnl | | |
| 5,256,106 A | 10/1993 | Shrawdeer | | |
| 5,376,046 A * | 12/1994 | Shuknecht et al. | | 460/99 |
| 5,519,987 A | 5/1996 | Voss et al. | | |
| 5,761,891 A | 6/1998 | Ferrari | | |
| RE35,917 E * | 10/1998 | Fischer et al. | | 56/12.9 |
| 5,941,768 A | 8/1999 | Flamme | | |
| 6,358,141 B1 | 3/2002 | Stukenholtz | | |
| 7,524,242 B2 | 4/2009 | Stukenholtz | | |
| 7,717,778 B2 * | 5/2010 | Redekop et al. | | 460/101 |
| 7,811,161 B1 * | 10/2010 | Ricketts et al. | | 460/26 |
| 7,837,542 B1 * | 11/2010 | Ricketts et al. | | 460/99 |
| 7,862,411 B1 * | 1/2011 | Ricketts et al. | | 460/23 |
| 7,867,071 B1 * | 1/2011 | Ricketts et al. | | 460/23 |
| 7,927,198 B2 * | 4/2011 | Redekop et al. | | 460/99 |
| 2010/0267432 A1 * | 10/2010 | Roberge et al. | | 460/59 |

FOREIGN PATENT DOCUMENTS

| | | |
|---|---|---|
| EP | 1380204 A1 | 1/2004 |
| GB | 2219722 A | 12/1989 |

* cited by examiner

*Primary Examiner* — Arpad Fabian-Kovacs
(74) *Attorney, Agent, or Firm* — Brett Trout (57) ABSTRACT

A combine is provided with an improved system for collecting agricultural material, such as stover, from an agricultural field and separating desired parts of the stover, such as corncobs, from undesired parts. The combine is provided with a system for moving the desired portion of the stover to a container and discarding the undesired portion of the stover back on the agricultural field.

20 Claims, 7 Drawing Sheets

AGRICULTURAL MATERIAL SEPARATOR

TECHNICAL FIELD

The present invention relates in general to a system and method for harvesting agricultural material and, more particularly, to a system and method for harvesting corncobs from an agricultural field.

BACKGROUND

The present invention relates to an improvement on the system and method described in U.S. Pat. No. 7,524,242 to Stukenholtz, which is incorporated herein by this reference. Agricultural combines are capable of both harvesting and threshing agricultural material in a single vehicle. Different front ends, or headers, may be attached to the combine to harvest and thresh various types of agricultural material, such as corn, wheat, soybeans, chaff, stover, switch grass, grass, wildflowers, flowers, as well as other types of grain, seeds and organic matter. One known type of header is a corn header which, when attached to a combine, collects ears of corn from an agricultural field. Corn kernels are provided on the ear, which is, in turn, secured to the corn stalk. Combines fitted with corn headers grab the ears of corn from the stalk. While it is often desirable to separate the ear from the stalk and leave the stalk secured to the agricultural field, depending upon the type of header used, the settings of the header, and the strength with which the ears are secured to the stalks, the combine may uproot and process some or all of the stalk.

Prior art combines are designed to separate ears of corn from stover, including the stalks, husks and remaining chaff. Once the ears have been separated, the combine processes each ear of corn through a thresher to separate the kernels of corn from the cobs. Typically the stover, now including the shelled cobs along with the other chaff, are ejected back into the agricultural field. The corn kernels are separated from the stover and moved to a storage container, either on the combine or in another vehicle. While the prior art has taught methods for retaining grain and discarding stover, with the advent of corncobs being used for fuel, it has become desirable to collect the corn cobs as well. It is possible to go back through the field after a combine has extracted the grain and collect the cobs lying on the agricultural field, but the cobs are difficult to pick up off the ground and will become contaminated with dirt or other material.

It is possible to modify a combine to direct the stover from the combine directly into another vehicle, but most types of stover do not justify the collection thereof. While almost all types of stover may be converted into some type of energy, most of the stover is "too fluffy" to justify its collection for subsequent use. The problem with much of the stover is that its density is too light in comparison to its energy content to justify its collection. When added back to the agricultural field, this light stover is easily biodegradable, adds nutrients back to the field and prevents erosion. Conversely, stover such as corncobs, biodegrades more slowly, has a high density and has high energy content. It is therefore advantageous to return light stover to the field and collect corn cobs for subsequent energy generation. It would be desirable to provide a system and method for adapting existing combines to collect both the corn kernels and high-density cobs. U.S. Pat. No. 7,524,242 describes a method for harvesting, cleaning and storing both corn kernels and whole cobs on a combine. This system and method has proven advantages. It would be desirable, however, to provide an alternative system and method for collecting both corn kernels and whole cobs using a single combine.

The difficulties encountered in the prior art discussed hereinabove are substantially eliminated by the present invention.

SUMMARY OF THE DISCLOSED SUBJECT MATTER

In an advantage provided by the present invention, a system and method for harvesting agricultural material is provided which separates cobs from grain and other chaff for collection.

Advantageously, this invention provides a system and method for harvesting corncobs which reduces corncob loss.

Advantageously, this invention provides a system and method for collecting chaff which reduces clogging.

Advantageously, this invention provides a system and method for collecting chaff which reduces the amount of low density material collected with the chaff.

Advantageously, this invention provides a system and method for collecting corncobs which may be retrofitted onto existing agricultural collection equipment.

In an advantage provided by this invention, an agricultural material separator is provided having an agricultural vehicle with a harvester and thresher. The vehicle collects the agricultural material and separates the grain from the chaff. The chaff is provided onto a screen with a conveyor through which a fan blows air to remove low density material from the chaff. An auger is provided below the conveyor to collect cobs as they pass from the screen. Stalks and other undesirable agricultural material too large to fall into the auger are expelled from the combine. The auger directs the cobs to an assembly of paddles for transport to a storage container on the combine or on another vehicle.

BRIEF DESCRIPTION OF THE DRAWINGS

The present invention will now be described, by way of example, with reference to the accompanying drawings in which:

FIG. 6 illustrates a side elevation in partial cross section of an alternative embodiment of the present invention, shown with a beater provided over the stover processor.

DETAILED DESCRIPTION OF THE DRAWINGS

Figure 1:
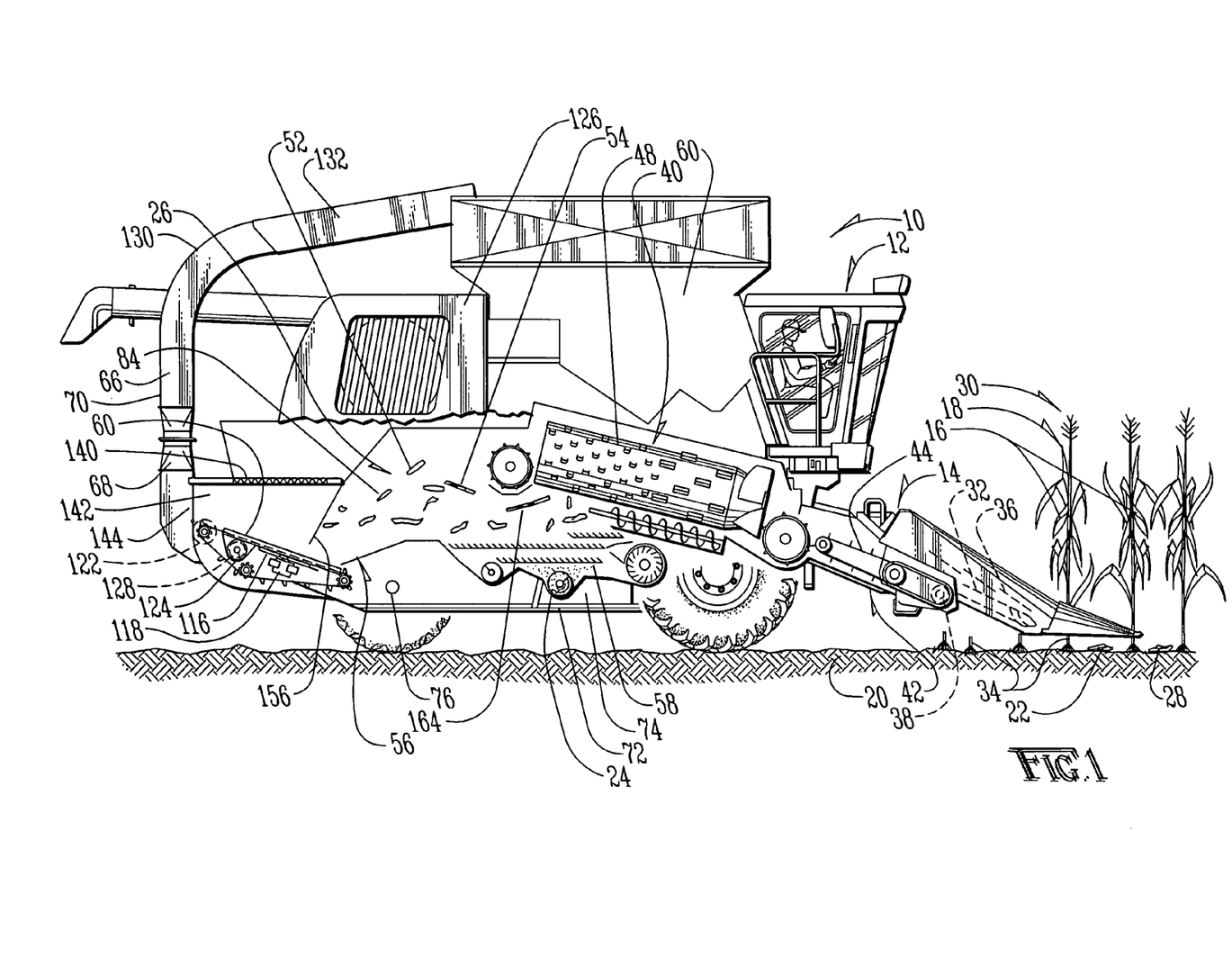
FIG. 1 illustrates a side elevation in partial cross section of the agricultural material separator of the present invention.

An agricultural material separator, such as an agricultural material cleaning system, is shown generally as (10) in FIG. 1. The cleaning system (10) has an agricultural vehicle (12), such as a John Deere Model STS Combine, provided with an agricultural material harvester, such as a combine header (14), which in the preferred embodiment is a corn header. The header (14) may, of course, be a platform header, windrow header or pick-up type header if it is desired to utilize the present invention to collect non-grain agricultural material other than corncobs.

The header (14) is preferably adjusted for harvesting of the desired crop. As shown in FIG. 1, the header (14) is positioned low enough to pick up the lowest ears (16) of corn (18), but high enough to avoid having the header (14) contact the agricultural field (20), rocks (22) or other non-plant material in the agricultural field (20) that could cause damage to the header (14). If the corn (18) is bent the header (14) may be lowered to gather the stover (26) into the combine (12). The combine (12) is preferably provided with gathering points (28) that run between the rows (40) of corn (18) to direct the corn (18) into the stalk rolls (32). As the combine (12) moves through the agricultural field (20), the corn (18) is directed by the gathering points (28) toward the stalk rolls (32).

The stalk rolls (32) grab the cornstalks (34) and pull them downward until the ears (16) contact the stripper plates (36) which separate the ears (16) from the stalks (34). The header (14) is also provided with a cross auger (38) which directs the ears (16) to the center of the header (14) where the ears (16) are conveyed toward the thresher (40) by the feeder house (42), in a manner such as that known in the art. The feeder house (42) includes a plurality of metal ribs (44) connected to chains (46) that move the ears (16) into the thresher (40).

Figure 2:
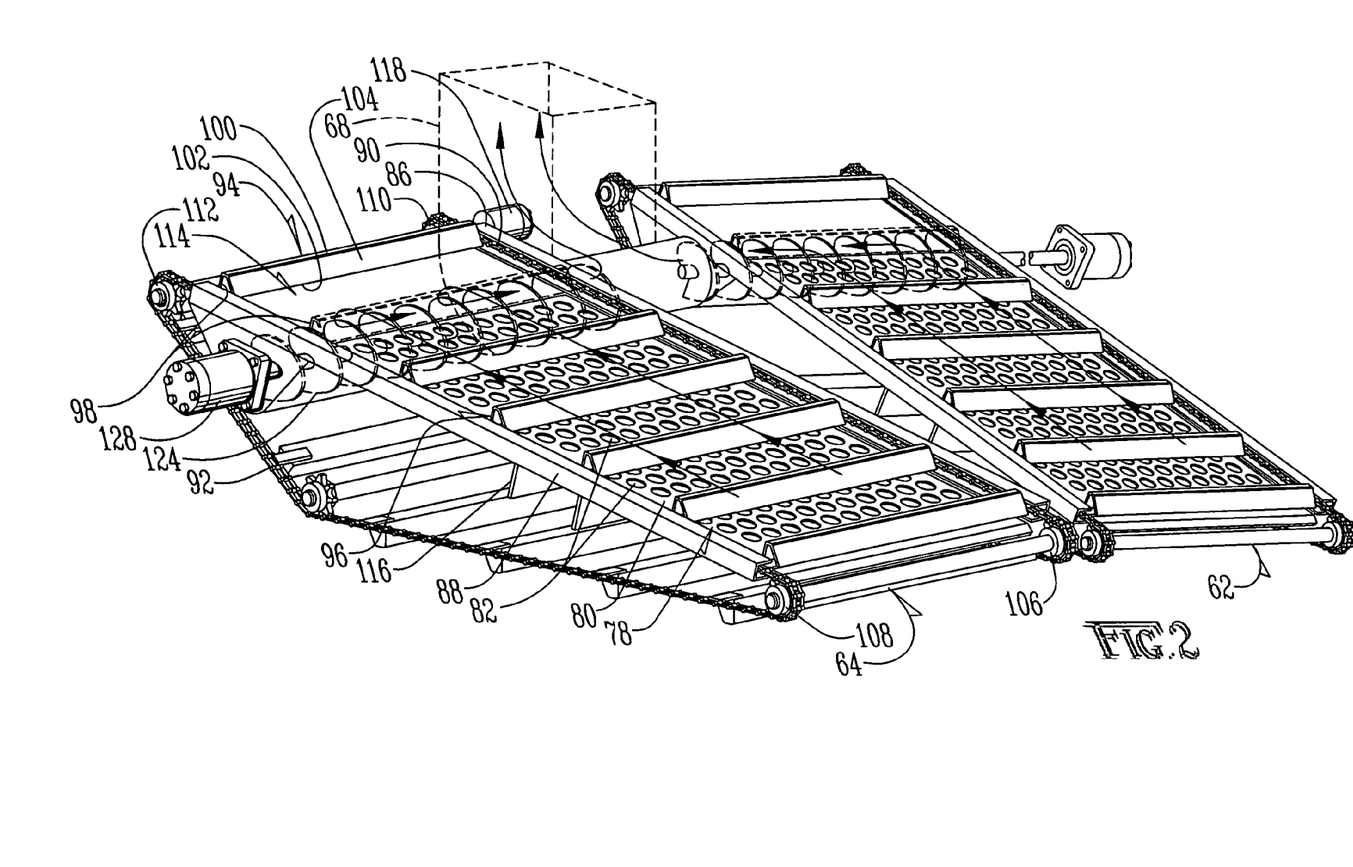
FIG. 2 illustrates a top perspective view of the stover processors of the agricultural material separator of FIG. 1.

The ears (16) enter the thresher (40) where they are shelled of their kernels (24) by a single or multiple rotary cylinders (48). The rotary cylinder (48) discharges stover (26) that includes shelled cobs (52) and other chaff (54) through a stover output (56). The corn kernels (24) pass by the rotary cylinder (48) through a screen (58) to a collection point (50) and then transported and collected in a grain collector, such as a bin (60) provided on the combine (12). The stover (26) passes from the stover output (56) to a pair of stover processors (62) and (64). (FIGS. 1-2). The stover processors (62) and (64) are angled outward laterally away from one another to accommodate an agricultural material stover duct (66).

The duct (66) is in fluid communication with ductwork (68) supplied by a separated agricultural material mover, such as a blower (70). The ductwork (68) is generally T-shaped to allow the ductwork (68) to be mounted to the combine frame (74). The T-shape of the ductwork (68) also allows the blower (70) to be coupled to either side of the combine (12). If it is desired to attach the blower (70) to the opposite side of the combine (12), the duct cap (73) is simply removed from the ductwork (68), the blower (70) attached to the combine (12) and ductwork (68) and the duct cap (73) is attached to the opposite side of the ductwork (68). The duct cap (73) may be attached with bolts or any type of fastening system known in the art.

A hydraulically driven rotating assembly of paddles (75) is provided at least partially in the duct, to assist in propelling corn cobs (52) through the duct (66). The assembly of paddles (75) is preferably rotatable drum with paddles attached. The assembly and the paddles themselves may be of any desired configuration. The speed at which the paddles are rotated may be adjusted as desired as well. Alternatively, instead of a blower (70), the separated agricultural material mover may be a plurality of paddle conveyors provided within the duct of a standard agricultural elevator or a paddle wheel impeller used without a supporting blower to throw the separated agricultural material toward a designated target such as a cart.

As shown, the stover processors (62) and (64) are provided on a frame (72) constructed of steel or similarly suitable material, and bolted or otherwise secured to the frame (74) of the combine (12). The frame (72) extends rearward underneath the axle (76) of the combine (12) and angles upward to position the stover processors (62) and (64) beneath the stover output (56).

The stover processor (62) is provided with a screen (78) constructed of a steel plate (80) provided with a plurality of holes. While the holes (82) may be of any suitable number, size and configuration, preferably the holes (82) are large enough and numerous enough to provide a sufficient amount of airflow through the screen (78) to remove light stover (84) from the screen (78), but small enough to prevent cobs (52) from passing downward through the screen (78).

The stover processor (62) also includes a pair of side rails (86) and (88) between which is provided apron chains (90) and (92), forming part of a roller chain cross conveyor (94). Provided between the chains (90) and (92) are a plurality of slats (96) of size and configuration sufficient to move stover (26) over the screen (78).

As shown, the slats (96) may be provided with a face (98) perpendicular to the screen (78) along its leading edge, a flat top (100), a flat bottom (102) and a tapered face (104) along its trailing edge. The height of the slats (96) and the dimensions of the screen (78) may be adjusted according to the type of material being gathered. For corn, a screen (78) preferably between 0.3 and 3.0 meters wide, and between 0.3 and 3.0 meters long, and more preferably about 0.9 meters square, may be used. The apron chains (90) and (92) are provided around a first pair of sprockets (106) and (108) near the front of the screen (78), a second pair of sprockets (110) and (112) near the rear of the combine (12) and a third pair of idler sprockets (109) and (111) under the screen (78).

Figure 3:
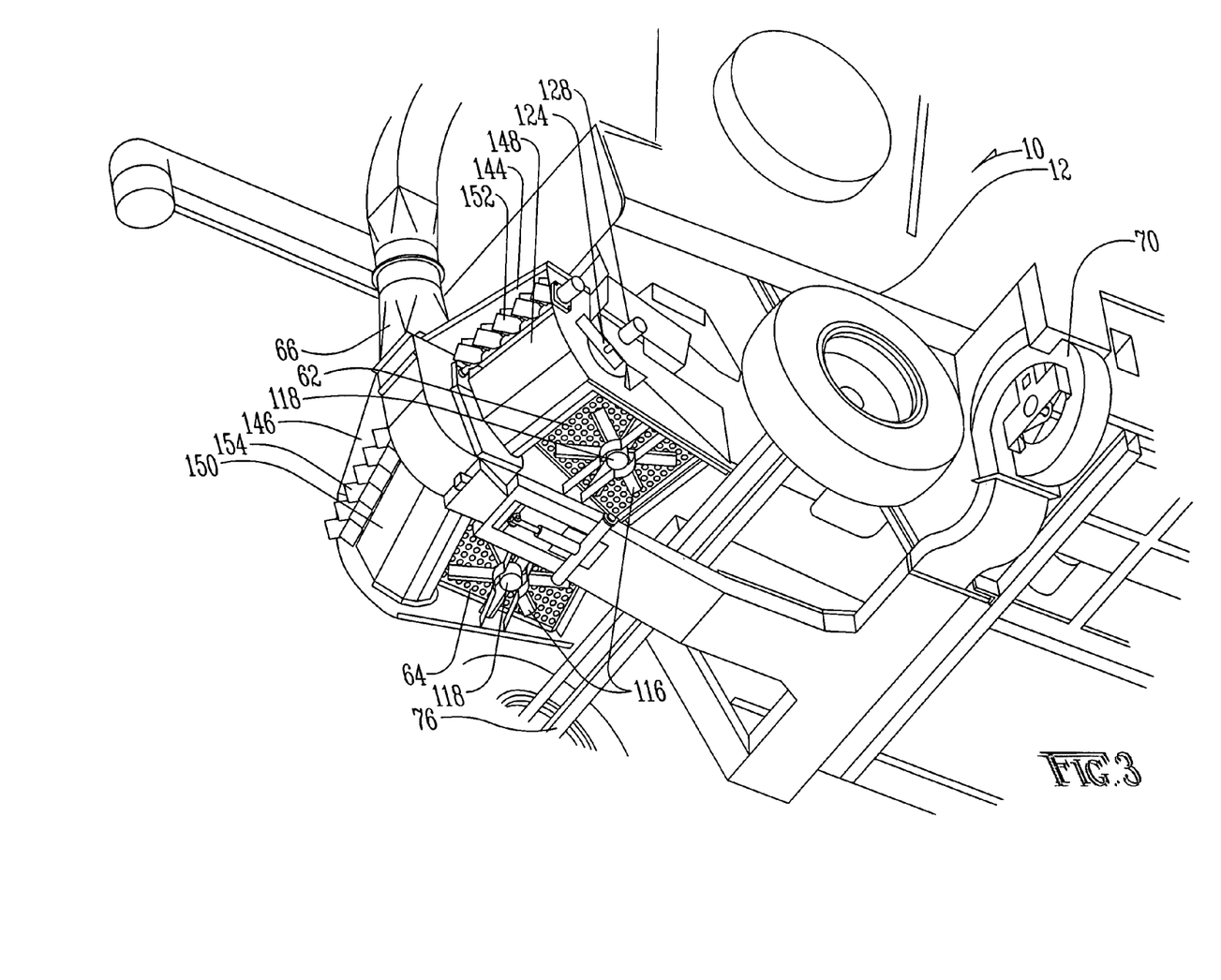
FIG. 3 illustrates a bottom perspective view of the rear of the agricultural material separator of FIG. 1.
Figure 4:
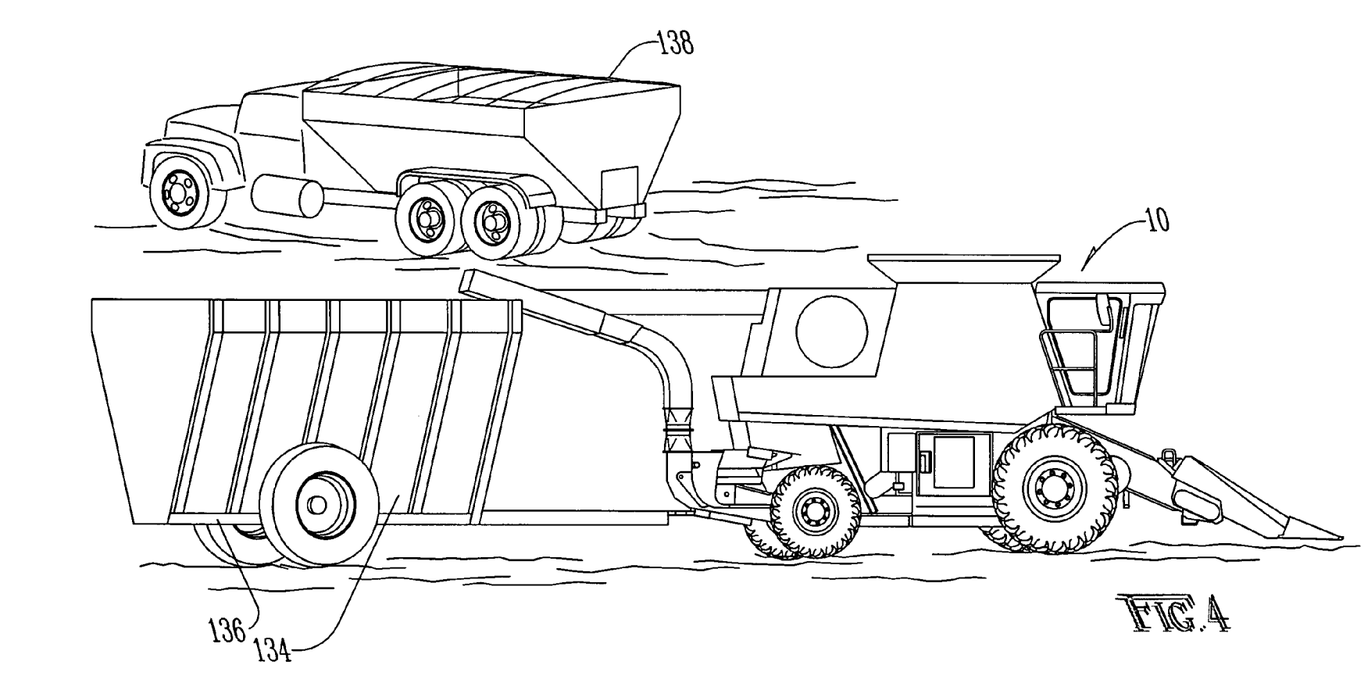
FIG. 4 illustrates a side perspective view of the agricultural material separator of the present invention towing a cart and a truck provided with a grain container.
Figure 5:
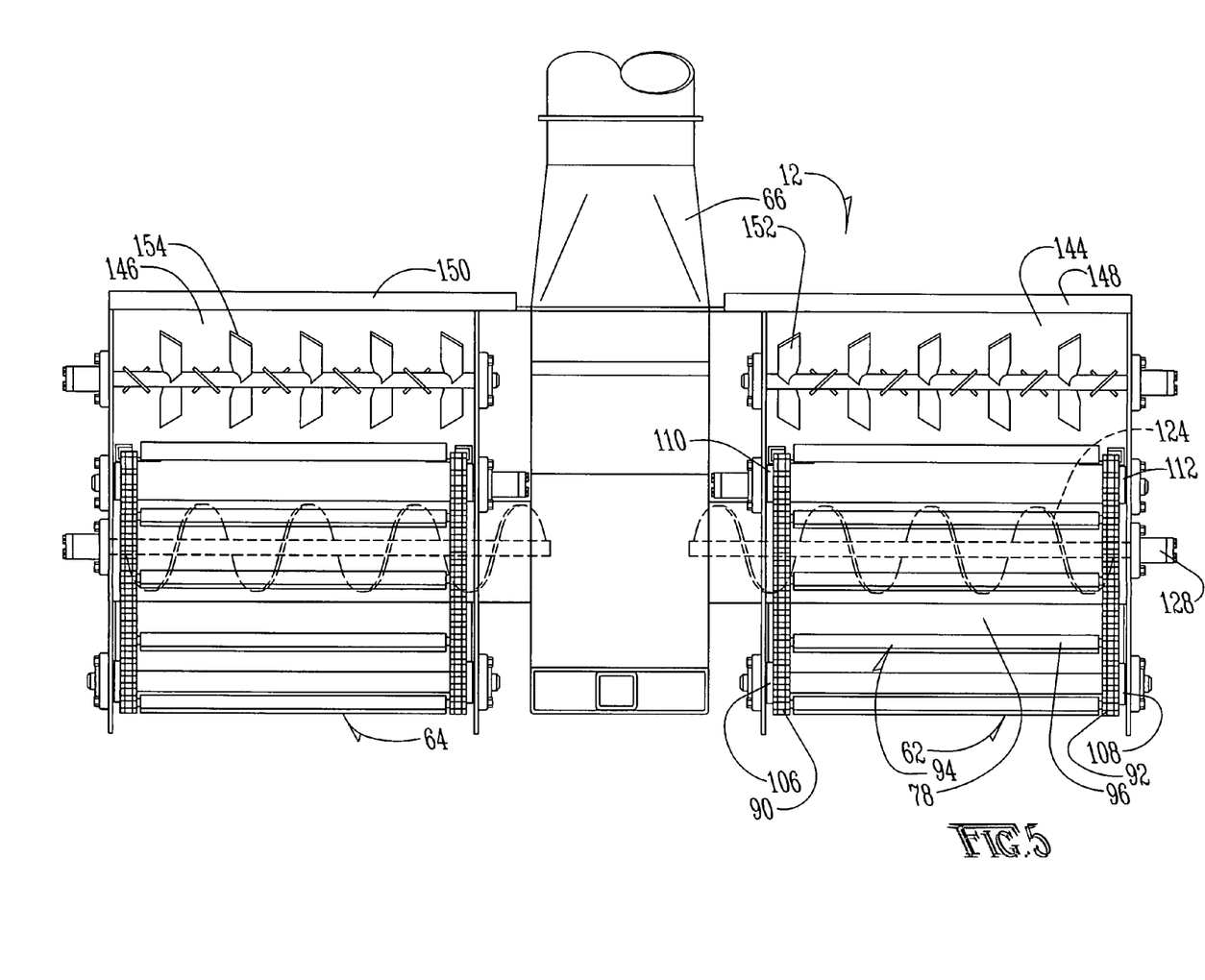
FIG. 5 illustrates a rear perspective view of the agricultural material separator of FIG. 1.

As shown, the side rails (86) and (88) and roller chain cross conveyor (94) extend between 0.5 and 2.0 meters past the end of the screen (78), creating an opening (114) less than a meter long and a meter wide through which cobs (52) may fall past the slats (96). Provided under the screen (78) is an air mover such as a fan (116). (FIGS. 2-3). The fan (116) may be constructed of any known material and any known dimensions, but it is preferably of slightly smaller diameter than the width of the screen (78). The fan (116) is secured to the frame (72) and driven by a hydraulic motor (118) powered by the engine (120) of the combine (12). (FIGS. 1-3). The fan (116) is preferably provided below the top portion of the roller chain cross conveyor (94) and above the lower portion of the roller chain cross conveyor (94). The roller chain cross conveyor (94) is preferably driven by a hydraulic motor (122), also powered by the engine (120).

Provided below the opening (114) and between the top and bottom of the roller chain cross conveyor (94) is a separated agricultural material transport, such as a separated stover transport in the form of a cross auger (124). The cross auger (124) is driven by a hydraulic motor (126) and delivers the cobs (52) to the assembly of paddles (75) driven by a hydraulic motor (128). The duct (66) is provided with an output (130). The duct (66) may be moved to couple the output (130) to a duct (132) in communication with the bin (60) on the combine (112) or, alternatively, to a container (134) of a cart (136) or other vehicle (138). Positioned over the stover processor (62) is an air vent (140) formed in the housing (142) coupled to the frame (72). At the end of the stover processors (62) and (64) are a pair of outlets (144) and (146) formed in the housing (142). Provided forward of each outlet (144) and (146) are a pair of residue spreaders (148) and (150), preferably driven at between about 100 and 1500 revolutions per minute and more preferably driven between 300 and 1000 revolutions per minute. The residue spreaders (148) and (150)

are preferably modified with angled paddles, so that in addition to physically propelling material out of the outlets (144) and (146), the spreaders (148) and (150) draw air and light material propelled by the fan (116) up from the stover processors (62) and (64) and out the outlets (144) and (146).

When it is desired to use the agricultural material cleaning system (10) of the present invention, the speed of the roller chain cross conveyor (94), the distance between the slats (96), the speed of the fans (116) and the size of the openings (114) over the cross auger (124) are adjusted, depending upon the type of material being collected and the conditions of the material and weather.

Figure 7:
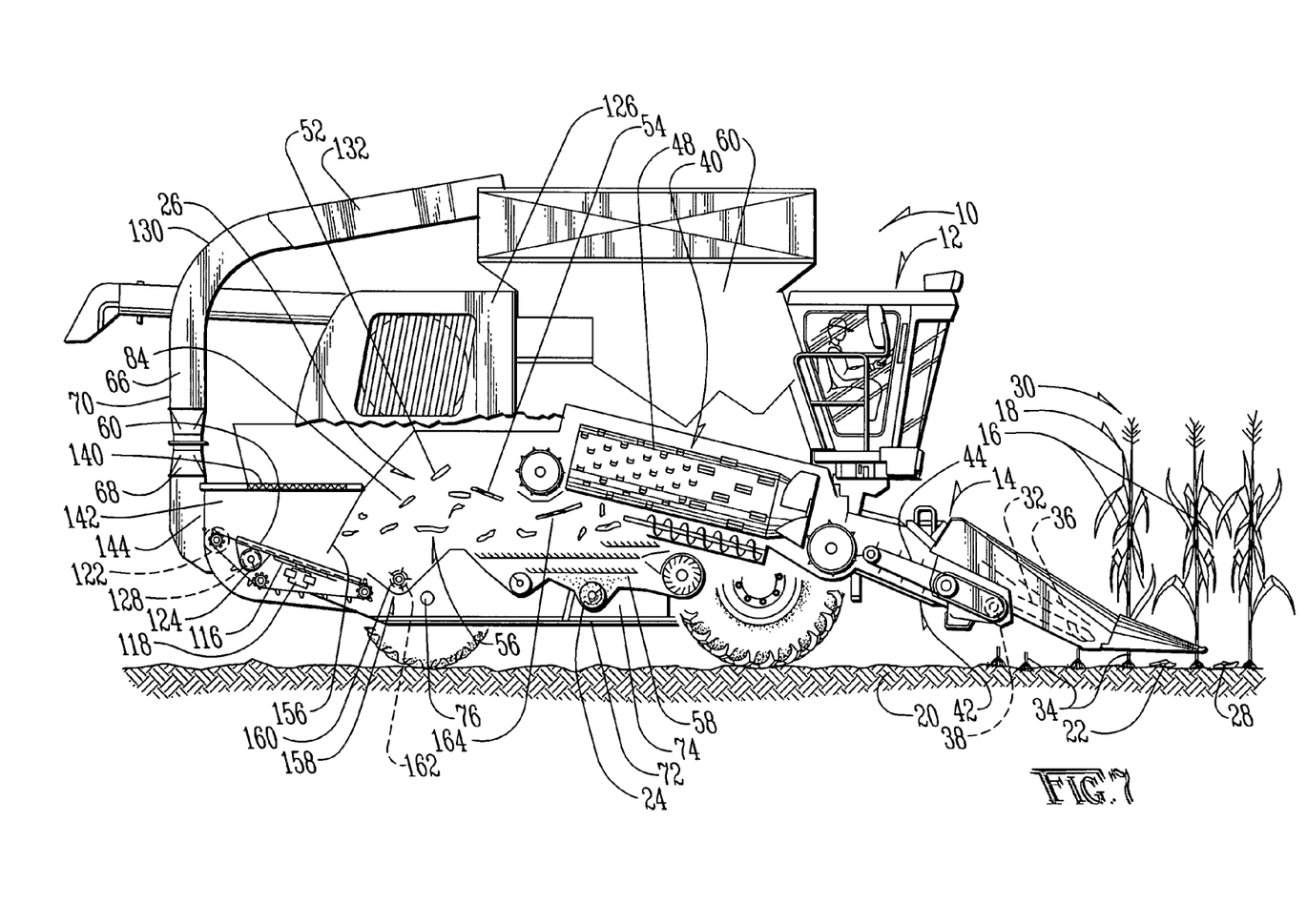
FIG. 7 illustrates a side elevation in partial cross section of an alternative embodiment of the agricultural material separator of the present invention.
Figure 8:
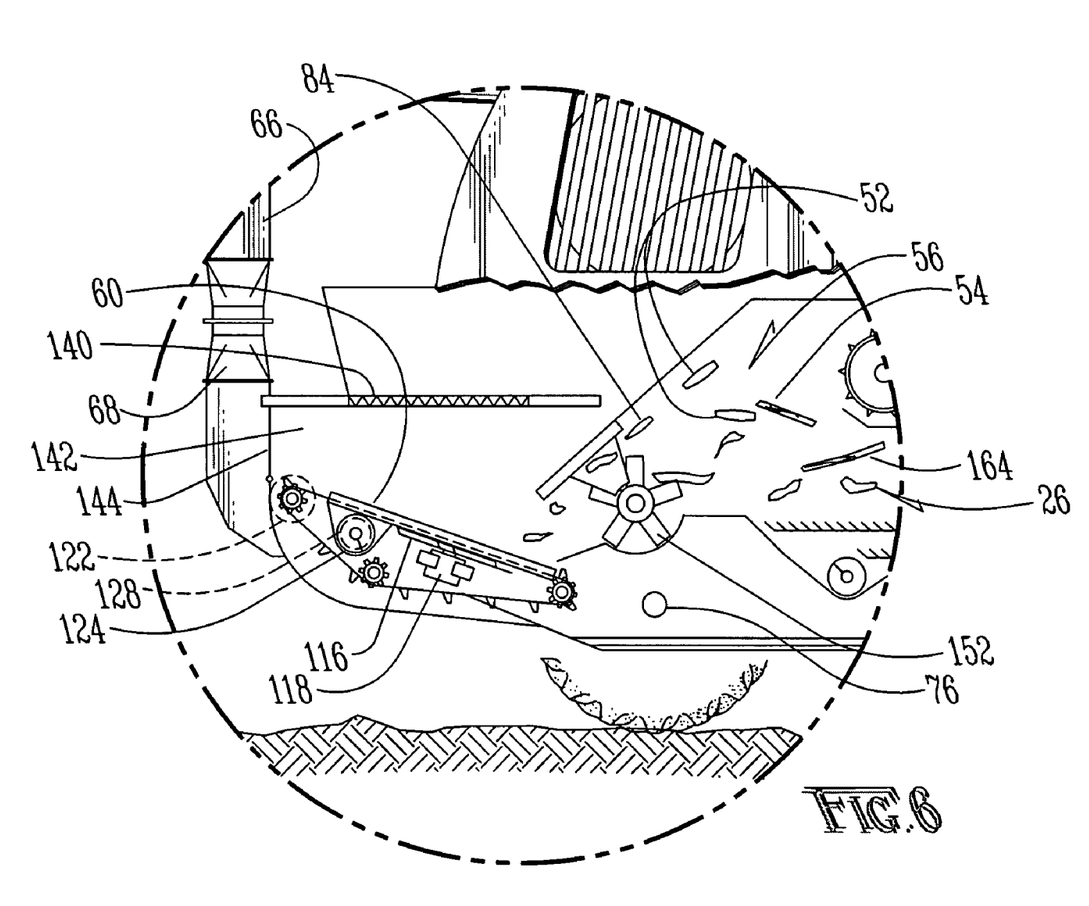

As the stover (26) exits through the stover output (56), the stover (26) expels on to the stover processors (62) and (64). As shown, the stover output (56) may be provided with a door (156) opening into a chopper (152), such as that known in the art. Depending upon how the chopper (152) is attached to the combine (12), the chopper (152) may be either moved to the windrow position, to allow the stover (26) to be supplied directly to the stover processors (62) and (64), or the floor of the chopper (152) may be opened to allow the stover (26) to avoid the chopping action of the chopper (152). While the chopper (152) may be left in place, the chopper (152) is not required to collect the cobs (52) and the chopper (152) requires a large amount of energy. If the chopper (152) is moved to the windrow position, and the door (156) may be angled to assist in directing the stover (26) on to the stover processors (62) and (64) as desired. Alternatively, as shown in FIG. 7, a beater (158) may be provided with a plurality of paddles (160) and driven by a hydraulic motor (162) and positioned near the output (56) to propel the stover (26) on to the stover processors (62) and (64).

As the stover (26) lands on the stover processors (62) and (64), the fan (116) draws air upward through the screen (78), carrying light stover (84) away from the screen (78), onward through the air vents (140) and the housing (142). (FIGS. 1-3). The speed of the roller chain cross conveyor (94), the distance between the slats (96), and the speed of the fan (116) are adjusted so that substantially all of the light stover (84) is removed from the screens (78) before the stover (26) has reached the openings (114) at the end of the screen (78). Once the stover (26) reaches the openings (114), the cobs (52) fall through the openings (114) and into the cross auger (124). The heavier and longer stover (164), such as the corn stalks (34) are too large to pass through the opening (114) and travel over the opening (114) to be discharged through the outlets (144) and (146) in the housing (142).

The cross auger (124) conveys the cobs (52) to the duct (66) where the bower (70) and the assembly of paddles (75) moves the cobs (52) through the blower (70) of the duct (66) to the output (130) of the duct (66), where the cobs (52) move to the container (132) on the combine (12). Alternatively, the duct (66) may direct the cobs (52) through the output (130) to a container (134) on a cart (136) pulled behind the combine (12), or in a vehicle (138) positioned near the combine (12).

Although the invention has been described with respect to a preferred embodiment thereof, it is to be understood that it is not to be so limited since changes and modifications can be made therein which are within the full, intended scope of this invention as defined by the appended claims. For example, the cross augers (38) may be replaced with roller chain cross conveyors (94) or similar conveyors known in the art. Also, the duct (66) may be provided with a paddle beater to propel the cobs (52) through a hollow duct. Additionally, the stover processors (62) and (64) may be drive electronically, hydraulically, pneumatically or by any known motivation.

What is claimed is:

1. An agricultural material cleaning system comprising:
   (a) an agricultural vehicle;
   (b) an agricultural material harvester coupled to the agricultural vehicle;
   (c) a screen;
   (d) an agricultural material conveyor provided over the screen, said agricultural material conveyor forming a loop defining an interior;
   (e) a fan provided below the screen;
   (f) a separated agricultural material transport provided at least partially below the agricultural material conveyor to receive separated agricultural material from the agricultural material conveyor; and
   (g) wherein the screen is located at least partially within the interior defined by the loop.

2. The agricultural material cleaning system of claim 1, further comprising a separated agricultural material mover positioned to move separated agricultural material from the separated agricultural material transport.

3. The agricultural material cleaning system of claim 2, further comprising a separated agricultural material duct positioned for receipt of separated agricultural material from the separated agricultural material mover.

4. The agricultural material cleaning system of claim 1, wherein the agricultural material harvester is a combine header.

5. The agricultural material cleaning system of claim 4, wherein the separated agricultural material transport is an auger.

6. The agricultural material cleaning system of claim 5, wherein the air mover is a fan.

7. The agricultural material cleaning system of claim 1, further comprising:
   (a) a supplemental screen;
   (b) a supplemental agricultural material conveyor provided over the supplemental screen;
   (c) a supplemental air mover provided below the supplemental screen; and
   (d) a supplemental separated agricultural material transport provided below the supplemental agricultural material conveyor.

8. The agricultural material cleaning system of claim 7, further comprising a separated agricultural material mover positioned to move separated agricultural material from the separated agricultural material transport.

9. The agricultural material cleaning system of claim 7, wherein the air mover is a first fan and wherein the supplemental air mover is a second fan.

10. The agricultural material cleaning system of claim 7, further comprising a separated agricultural material duct positioned for receipt of separated agricultural material from the separated agricultural material mover.

11. The agricultural material cleaning system of claim 10, wherein the separated agricultural material mover is positioned between the agricultural material conveyor and the supplemental agricultural material conveyor.

12. An agricultural material cleaning system comprising:
    (a) an agricultural vehicle;
    (b) an agricultural material harvester;
    (c) a thresher;
    (d) a grain collector;
    (e) a screen;
    (f) a stover conveyor provided over the screen, said stover conveyor forming a loop defining an interior;
    (g) a fan provided below the screen;

(h) a separated stover transport provided at least partially below the stover conveyor; and
(i) wherein the screen is located at least partially within the interior defined by the loop.

13. The agricultural material cleaning system of claim 12, further comprising an assembly of paddles positioned to receive separated stover from the separated stover transport.

14. The agricultural material cleaning system of claim 12, wherein the air mover is a fan.

15. The agricultural material cleaning system of claim 12, further comprising:
 (a) a supplemental screen;
 (b) a supplemental stover conveyor provided over the supplemental screen;
 (c) a supplemental air mover provided below the supplemental screen; and
 (d) a supplemental separated stover transport provided below the supplemental screen.

16. The agricultural material cleaning system of claim 15, further comprising an assembly of paddles positioned between the air mover and the supplemental air mover.

17. An agricultural material cleaning system comprising:
 (a) an agricultural combine provided with a stover output;
 (b) a screen;
 (c) a stover conveyor provided over the screen, said stover conveyor forming a loop defining an interior;
 (d) a fan provided under the screen;
 (e) a separated stover transport provided at least partially below the stover conveyor; and
 (f) wherein the screen is located at least partially within the interior defined by the loop.

18. The agricultural material cleaning system of claim 17, further comprising:
 (a) a supplemental screen;
 (b) a supplemental stover conveyor provided over the supplemental screen;
 (c) a supplemental air mover provided below the supplemental screen; and
 (d) a supplemental separated stover transport provided below the supplemental screen.

19. The agricultural material cleaning system of claim 18, further comprising an assembly of paddles positioned between the air mover and the supplemental air mover.

20. The agricultural material cleaning system of claim 17, wherein the stover conveyor is a continuous loop that passes over and under the screen and wherein the air mover is located within the continuous loop.

* * * * *